No. 852,668. PATENTED MAY 7, 1907.
L. P. MARSAL & R. W. BAKER.
VEHICLE WHEEL.
APPLICATION FILED MAY 3, 1906.
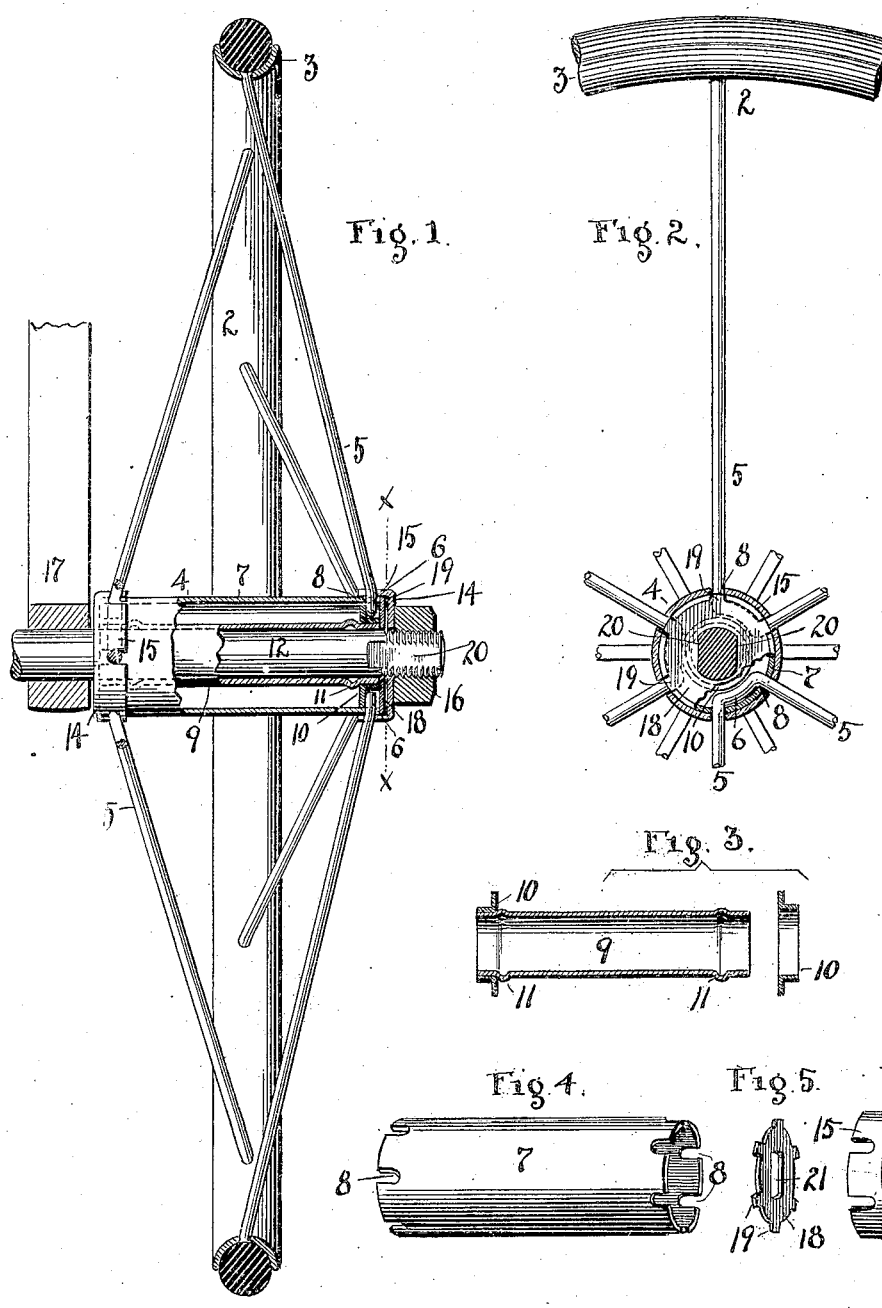
ATTEST.
INVENTORS
Louis P. Marsal
Richard W. Baker
By H. T. Fisher ATTY

UNITED STATES PATENT OFFICE.

LOUIS P. MARSAL AND RICHARD W. BAKER, OF CLEVELAND, OHIO.

VEHICLE-WHEEL.

No. 852,668.   Specification of Letters Patent.   Patented May 7, 1907.

Application filed May 3, 1906. Serial No. 314,966.

*To all whom it may concern:*

Be it known that we, LOUIS P. MARSAL and RICHARD W. BAKER, citizens of the United States, residing at Cleveland, in the county of Cuyahoga and State of Ohio, have invented certain new and useful Improvements in Vehicle-Wheels; and we do declare that the following is a full, clear, and exact description of the invention, which will enable others skilled in the art to which it appertains to make and use the same.

Our invention relates to improvements in vehicle wheels, and the improvement consists in a wheel more especially adapted for juvenile vehicles of the self propelling kind, such as tricycles, automobiles, and the like, all substantially as shown and described and particularly pointed out in the claims.

Our improved construction is designed to be both light and strong with the fewest possible number of parts to make a well finished wheel and especially a drive wheel for juvenile vehicles.

In developing this invention we have also aimed to produce the simplest construction consistent with serviceability and have thereby gained in lowering the cost of production.

In the accompanying drawings Figure 1 is a cross sectional view of the wheel with the hub partly sectioned away and showing the same mounted and connected with a vehicle axle. Fig. 2 is a sectional view on line *x, x*, Fig. 1 showing the various locking parts of the wheel and axle in their assembled relation. Fig. 3 is a sectional view of the axle bearing sleeve of the wheel and its flanged rings, showing one ring as mounted thereon at one end and the other ring removed and alone opposite the other end. Fig. 4 is a perspective view of the wheel hub barrel alone with all other parts removed. Fig. 5 is a perspective view of the toothed locking disk for uniting the wheel hub and axle, and Fig. 6 is a perspective view of the locking cap for confining the spokes in place upon the hub.

Wheel 2 comprises the usual rim 3 of any preferred form and hub 4 united with said rim 2 by wire spokes 5. One piece of wire forms two spokes as said wire is bent midway between its ends to provide two diverging stems with a middle connecting portion 6 slightly curved to conform to the inner curvature of the hub barrel 7. There are six spokes 5 radiating from each end of barrel 7 making twelve in all, and each spoke 5 extends from its connecting portion 6 through slots 8 in the ends of barrel 7 and the free end of each spoke is secured or riveted to its proper place on rim 2.

Barrel 7 is provided with an inner tubular bearing 9 of smaller diameter than said barrel, and flanged rings or washers 10 are sleeved over the ends of bearing 9 and abut against annular beads 11 formed therein at the proper distance from the ends thereof to bring said rings 10 approximately opposite the base of slots 8 and whereby connecting portions 6 of the spokes 5 will lie in close abutting relation thereto and be snugly confined by three several walls formed by the parts described. A forced fit between barrel 7, rings 10 and tubular bearing 9 is made to provide a rigid structure adapted to sleeve over axle end 12 either to rotate thereon or to rotate therewith as may be desired. If free rotation of the hub upon the axle is desired there is only one additional member to be provided for each end of barrel 7 which comprises a cap 14 having a notched flange 15, and this cap is forced upon the ends of the hub barrel 7 to complete the locking of spokes 5 in place upon said barrel and also to confine said parts and close the ends against admission of dirt and dust. Caps 14 have a central opening through which axle 12 projects and a nut 16 on the threaded end of axle 12 confines the hub and wheel upon the axle. The other side of the hub abuts as usual against the axle support or bearing 17 which is attached to or forms part of the vehicle frame, not otherwise shown.

In a power driven vehicle of the juvenile class it is customary to have one wheel free and the other wheel united with the driving axle, and in this event we employ an additional member for locking one of the wheel hubs upon the shaft so that it may be driven thereby, and this locking member consists of a washer or disk 18 provided with a series of teeth or projections 19, six in number, which are adapted to fit closely between the sides of slots 8 at the outer end of hub barrel 7 when said member is sleeved over axle 12 and brought to bear against the end of tubular bearing 9. Hub barrel 7 is slightly longer than tubular bearing 9 so that locking member 18 may abut against said bearing and also come within the ends of barrel 7 to engage the sides of slots 8. Cap 14 is free to slip over locking member 18 and sleeve over the barrel end and engage spokes 5 and serves to hold said member in place as set. To complete the connection between the parts, axle end 12 has flattened portions 20 and disk or washer 18 has a central elongated opening 21 conforming to the cross sectional shape of this portion of the axle end. Thus, when said member 18 is sleeved upon the axle end and engaged with the slotted end of barrel 7 said parts are united to rotate together. It is designed that the force fit between cap 14 and barrel 7 will be sufficient to hold said parts together even though nut 16 should be displaced and the wheel should accidentally come off.

What we claim is:—

1. A hub for a vehicle wheel consisting of an outer barrel and an inner tubular bearing, separating rings between said barrel and bearing at their ends, and caps on the ends of the barrel, said caps and ends of the barrel having corresponding notches, in combination with spokes for the wheel confined within said notches by said caps.

2. A vehicle wheel comprising the rim, spokes and hub, said hub consisting of an outer barrel having notches at its ends for said spokes, an inner tubular bearing for the axle having annular beads back from its ends, flanged separating rings sleeved upon the ends of said bearing and abutting against said beads and adapted to fit closely within said barrel, and caps having notched flanges adapted to sleeve over said barrel ends to engage the spokes and close said sides.

3. A vehicle wheel comprising the rim, spokes and hub, said hub consisting of an outer barrel having notches in its ends, an inner tubular bearing for the axle, and separating rings mounted upon said bearing within said barrel, in combination with the vehicle axle and a locking member adapted to unite said barrel and axle to rotate together said axle constructed to lock rotarily in said locking member.

4. A wheel having a hub comprising an outer barrel with notched ends and an inner tubular bearing of shorter length than said barrel, separating rings sleeved upon the ends of said bearing and engaged with the barrel, spokes for the wheel engaged with the notched ends of said barrel and with said rings, and caps for said barrel ends, in combination with the wheel axle and a toothed member sleeved and locked upon said axle and adapted to lock with the notched end of said barrel.

5. A vehicle wheel having a hub comprising a barrel with open notches at both ends, an inner tubular bearing of less length than said barrel, flanged rings sleeved upon the ends of said barrel and stops to fix the position of said rings in respect to said barrel notches and the ends of said tubular bearing, twin spokes having a cross connection adapted to fit within the confining walls of the barrel and said rings and bearing, notched caps fitted upon the said barrel ends adapted to engage the spokes, and a toothed disk adapted to fit against said tubular bearing and within said barrel and engaged with the notched ends of the latter, in combination with the axle having locking portions for said disk.

In testimony whereof we sign this specification in the presence of two witnesses.

LOUIS P. MARSAL.
RICHARD W. BAKER.

Witnesses:
R. B. MOSER,
C. A. SELL.